July 11, 1933.  M. STONE  1,918,001

MEASURING APPARATUS

Filed Aug. 23, 1930

INVENTOR
Morris Stone.
BY
ATTORNEY

Patented July 11, 1933

1,918,001

UNITED STATES PATENT OFFICE

MORRIS STONE, OF PITTSBURGH, PENNSYLVANIA, ASSIGNOR TO WESTINGHOUSE ELECTRIC & MANUFACTURING COMPANY, A CORPORATION OF PENNSYLVANIA

MEASURING APPARATUS

Application filed August 23, 1930. Serial No. 477,321.

My invention relates to apparatus for measuring and determining the stresses in materials and has particular relation to apparatus of a type utilized in determining the torsional stresses in prismatical bodies.

The determination of the torsional stresses in prismatical bars having cross sections of circular, elliptical, hyperbolic, rectangular, triangular, or associated contours, has been reduced to a comparatively simple matter. The stresses existing in bodies of the above configuration may be calculated when the forces producing the stresses and the characteristics of the material making up the bodies are known.

However, the determination of the stresses in bodies having more irregular cross sections than those specified hereinabove is another matter. In many cases, the problem involved in producing a suitable set of relations for calculating the values has not been completely solved and hence, satisfactory solutions for these problems have not been produced.

The bodies which come under this class make up the greater portion of the practical cases that come up. Of prime importance in the connection is the determination of the stresses in propeller blades and in shafts with key ways. The importance that is attached to the solution of the general torsion problem which thus arises is therefor apparent.

In 1903, Professor L. Prandtl, of Gowtingen, recognized the similarity between the differential equations which dominate torsion phenomena and the differential equation of a uniformly loaded elastic membrane. He showed that it is possible by observing the characteristics of the membrane to determine the characteristics of a twisted article.

As far as I am aware, the only existing prior art in the field of measurement and determination of stresses in prismatical objects of cross section of any general contour is based on Professor Prandtl's analysis and depends on the measurement and observation of phenomena in a stretched membrane. While this method yields approximate results, it is rather difficult and expensive to carry out. Furthermore, there are situations wherein the results obtained by this procedure are not of sufficient accuracy to be useful.

It is, accordingly, an object of my invention to provide a method for determining the stresses in prismatical bodies of general cross-section that are under the action of torsional forces.

Another and more specific object of my invention is to provide apparatus for measuring the values that are necessary in determining the stresses in a prismatical body.

A further specific object of my invention is to provide electrical apparatus for measuring the electrical quantities necessary in providing a solution of the general torsion problem by electrical analogy.

An ancillary object of my invention is to provide a method and apparatus for determining the center of twist in a prismatical body under the action of torsional forces.

More concisely stated, it is an object of my invention to provide an electrical method, and apparatus for carrying out the method, for solving physical problems involving the well-known Poisson's equation $$(1) \quad \Delta^2 \theta = \gamma$$

wherein $\Delta^2$ is the conventional Laplaciam operator, $\theta$ is a scalar function of an arbitrary system of coordinates, and $\gamma$ is a constant, in the special cases that most frequently occur, and in general is a function of the coordinates.

According to my invention, I provide a method whereby the solution of the general torsion problem is attained by solving an analogous electrical problem and then by making the necessary transformation from the electrical solution to the mechanical solution. The electrical problem is readily solved with a system of apparatus that shall be described hereinafter.

As shall be seen, presently, the solution of the electrical problem involves, in general, the determination of the electrical properties of a test model, made up according to certain specifications that shall be derived hereinafter, and subjected to a predetermined set of electrical conditions.

The geometric properties of the test model is predetermined by the geometric properties of the prismatical article under consideration. The electrical properties of the test article and the electrical conditions to which it is subjected, mutually involve each other and are, to a certain extent, for this reason, arbitrary.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which Figure 1 is a plan view, showing a preferred embodiment of the apparatus utilized in practicing my invention;

Figure 1:
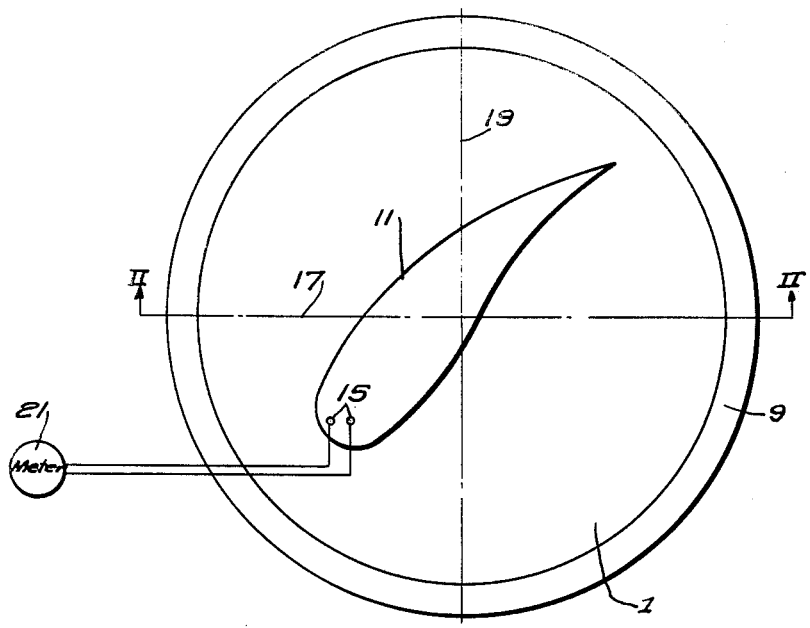
Figure 2:
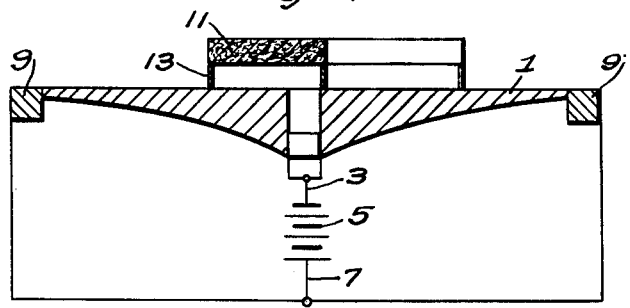
Fig. 2 is a view, in section, taken along the line II—II of Fig. 1.

From a mathematical standpoint, generic relations for the general torsion problem have been long known. The torsion problem is essentially a two-dimensional problem. That is to say, it may be considered as involving a bar under the action of a longitudinal torque. The shearing stress produced in a bar is then circuitous in the transverse faces thereof.

The generic expression involving the shearing stresses is $$(2) \quad \Delta^2 P = -2cG$$

wherein P is a stress function, the significance of which shall be seen hereinafter, $c$ is the specific angular twist, and G is the shear modulus.

Accordingly, when expressed in Cartesian coordinates (2) reduces to the relation $$(3) \quad \frac{\delta^2 P}{\delta x^2} + \frac{\delta^2 P}{\delta y^2} = -2cG$$

wherein now $x$ and $y$ may be regarded as representing a set of arbitrary coordinates, taken in the transverse planes of the prismoid, and it can easily be shown that $$(4) \quad T_x = \frac{\delta P}{\delta y}$$

$$(5) \quad T_y = -\frac{\delta P}{\delta x}$$

$T_x$ and $T_y$ being the components of the shearing stresses taken along the arbitrary set of axes.

Since, on the surface of the bar, the stresses $T_x$ and $T_y$ are zero, it follows that the derivatives $$\frac{\delta P}{\delta x}$$

and $$\frac{\delta P}{\delta y}$$

are zero and, as a result, P is a constant.

It is apparent that this constant may be properly taken as zero.

A problem that is analogous to the torsion problem and that may be solved with facility, involves the flow of electricity in a conducting plate of variable conductivity, subjected to a predetermined potential. This problem involves an equation closely related to Laplace's equation, which in two dimensions reduces to $$(6) \quad \frac{\delta}{\delta x}\left[f_3 \frac{\delta \phi}{\delta x}\right] + \frac{\delta}{\delta y}\left[f_3 \frac{\delta \phi}{\delta y}\right] = 0$$

where $\phi$ is the electrical potential, $f_3$ is the variable conductivity, and $x$ and $y$ are again a set of arbitrary coordinates.

If the plate has a contour of the same geometric structure as the cross-section of the twisted bar under consideration, the functions P and $\phi$ may be regarded as analogous functions and P may be expressed as a function of $\phi$. That is to say, P, and therefore the stresses, may be found if $\phi$ and its characteristics are known.

As can be seen, by comparing Equations (3) and (6), my invention involves the transformation of a mechanical potential problem with uniform sinks and constant boundary conditions into an electrical problem of no sinks, variable conductivity and suitably transformed variable boundary conditions.

Since, on the surface of the bar, the resultant shear stress must be parallel to the boundary 5'

$$T_x dy - T_y dx = 0$$

which in view of Equations (4) and (5) becomes 5''

$$\frac{\delta P}{\delta y} dy + \frac{\delta P}{\delta x} dx = dP = 0$$

therefore $$5''' \quad P = \text{constant}.$$

In absence of further restrictive information the mechanical function P may be expressed by the relation $$(7) \quad P = P(x, y, \phi, \phi_x, \phi_y, \phi_{xy}, \phi_{xx}, \phi_{yy} \ldots)$$

and $$(8) \quad \frac{\delta P}{\delta x} = f_1(x, y, \phi, \phi_x, \phi_y, \phi_{xy}, \phi_{xx}, \phi_{yy}, \ldots)$$

$$(9) \quad \frac{\delta P}{\delta y} = f_2(x, y, \phi, \phi_x, \phi_y, \phi_{xy}, \phi_{xx}, \phi_{yy}, \ldots)$$

wherein $\phi_x$, $\phi_{xx}$, $\phi_{xy}$, etc. represent the derivatives of $\phi$ and have the conventional meanings.

Now, Equation (6) expanded and expressed in the notation utilized above, yields the Equation

(10) $\quad f_3\phi_{xx}+f_3\phi_{yy}+\dfrac{\delta f_3}{\delta x}\phi_x+\dfrac{\delta f_3}{\delta y}\phi_y=0$ It will be remembered that $f_3$ and its derivatives are functions of the coordinates only, and as a result, it is to be noted that the equation (10) is a linear differential equation as regards $\phi$.

On the other hand, $\phi$ also obeys the equation that is obtained by substituting the expression for P in Equation (3) and expanding. This equation must, therefore, also be a linear differential equation in $\phi$ and hence, it follows, that $f_1$ and $f_2$ must be functions that are linear in $\phi$ and its derivatives. That is to say, these functions may be expressed explicitly as

(11) $\quad f_1=a_0+a_1\phi+a_2\phi_x+a_3\phi_y+a_4\phi_{xx}\ldots$ and

(12) $\quad f_2=b_0+b_1\phi+b_2\phi_x+b_3\phi_y+b_4\phi_{xx}\ldots$ where the $a$'s and $b$'s are functions of $x$ and $y$. Moreover, Equation (3) may be rewritten in terms of the functions and $f_1$ as $f_2$

(13) $\quad \dfrac{\delta f_1}{\delta x}+\dfrac{\delta f_1}{\delta y}=-2cG$ and when (13) is expanded it yields

(14) $\left[a_2+\dfrac{\delta a_4}{\delta x}+\dfrac{\delta b_4}{\delta y}\right]\phi_{xx}+\left[b_3+\dfrac{\delta a_5}{\delta x}+\dfrac{\delta b_5}{\delta y}\right]\phi_{yy}+$
$\left[a_1+\dfrac{\delta a_2}{\delta x}+\dfrac{\delta b_2}{\delta y}\right]\phi_x+\left[b_1+\dfrac{\delta a_3}{\delta x}+\dfrac{\delta b_3}{\delta y}\right]\phi_y+$
$\left[a_3+b_3+\dfrac{\delta a_6}{\delta x}+\dfrac{\delta b_6}{\delta y}\right]\phi_{xy}+\left[\dfrac{\delta a_1}{\delta x}+\dfrac{\delta b_1}{\delta y}\right]\phi+$
$\left[\dfrac{\delta a_0}{\delta x}+\dfrac{\delta b_0}{\delta y}+2cG\right]+a_4\phi_{xxx}+a_5\phi_{yyx}+$
$a_6\phi_{xyx}+b_4\phi_{xxy}+b_5\phi_{yyx}+b_6\phi_{xyy}+\ldots=0$ Now, since Equations (10) and (14) involving $\phi$ are identical, the coefficients of the $\phi$'s being functions of $x$ and $y$ only, must be equal, and hence, the functions $f_1$ and $f_2$ reduced to

(15) $\quad f_1=a_0+f_3\dfrac{\delta\phi}{\delta x}+\delta\dfrac{(\phi C_0)}{\delta y}$ and

(16) $\quad f_2=b_0+f_3\dfrac{\delta\phi}{\delta y}-\dfrac{\delta}{\delta y}(\phi C_0)$ and are subjected to the further restriction

(17) $\quad \dfrac{\delta a_0}{\delta x}+\dfrac{\delta b_0}{\delta y}=-2cG$

A still further restriction of the functions is attained from the boundary condition that has been mentioned hereinabove and that can be expressed as

(18) $\quad P=\text{constant}$ therefore

(19) $\quad dP=0=\dfrac{\delta P}{\delta x}dx+\dfrac{\delta P}{\delta y}dy$ or

(20) $\quad f_1 dx+f_2 dy=0$ and by substituting (15) and (16) in (20), the relation on the boundary becomes

(21) $\quad f_3 d\phi_b+a_0 dx+b_0 dy-\dfrac{\delta(\phi_b C_0)}{\delta n}ds=0$ wherein $n$ indicates the direction of the outer normal, $ds$ indicates an element taken along the boundary, and $\phi_b$ indicates the value of $\phi$ on the boundary.

In Equation (21) $a_0$, $b_0$, $C_0$, and $f_3$ are undetermined and, as shall be presently illustrated, may be so selected as to yield a simple experimental set-up.

It is to be noted that it is within the province of my invention to so select these functions as to yield any type of experimental set-up. However, in general the most useful experimental arrangement is the simplest that can be obtained.

A particular system that I have found useful is the one obtained by assuming a simple set of values for the indeterminate quantity. This system is obtained by assuming

(22) $\quad f_3=f_3(\sqrt{x^2+y^2})=f_3(r)$
(23) $\quad a_0=-cGx$
(24) $\quad b_0=-cGy$
(25) $\quad C_0=0$ in which case (21) becomes

(26) $\quad d\phi_b=\dfrac{cG}{f_3(r)_b}r_b dr_b$ wherein $r_b$ is now a radial distance from an arbitrarily chosen point within the surface of the prismatical bar that is under consideration; or, more concisely $r_b$ is the radial distance from an arbitrarily chosen coordinate center in the model test plate to the rim thereof.

The essential features of my invention may be observed by examining the Equation (26). This equation simply defines the potential on the boundary of a plate in terms of the conductivity. Furthermore, since the function P may be expressed in terms of $\phi$, it is possible, by adjusting the values of the potential on the boundary of a plate having the contour of the cross section of the stressed prismatical bar, by giving the plate a conductivity distribution, defined by the relation (26), and by measuring the potentials throughout the plate, to determine the value of P and its derivatives and hence, to determine the stresses in the prismatical bar. It is to be noted, that the potential distribution defined by Equation (26) refers only to the rim of the model plate and not to points in the interior thereof.

It is well to mention that the model plate described hereinabove, need not necessarily be of uniform thickness. As a matter of fact, it is apparent that by varying the thickness of the plate, the conductivity thereof may be given a suitable distribution.

It is of important significance that according to Equation (26) $\phi_b$ is defined as a function of the radial distance from an arbitrary point. That is to say, the characteristics of the prismatical bar that is under stress, such as the center of twist, need not necessarily be known to carry out the analogy and to solve the torsion problem. This feature is of extreme importance as it apparently results in considerable simplification of the method.

Of the infinite number of forms that may be assigned to $f_3$ the simplest, perhaps, from an experimental standpoint, is given by

(27) $f_3 = k$ a constant.

The conversion units are implicitly included in the value of $k$. In such a case (26) becomes, when integrated

(28) $\phi_b = \dfrac{CG}{2k}(r_b)^2$

It can be shown that when $\phi_b$ is expressed in this manner, that is if $f_3$ is a constant, the derivatives of P obey the necessary and sufficient condition for exactness and P may therefore be expressed as the function of $\phi$ defined by the derivatives of P.

For the solution derived hereinabove, it can be seen that the model plate must have uniform conductivity and that the potential applied to the boundary of the plate must vary as the square from an arbitrarily chosen point that may be adjusted in accordance with Equation (28).

The stresses are given in equations

(29) $T_x = k\dfrac{\delta\phi}{\delta y} - cGy$ and

(30) $T_y = -k\dfrac{\delta\phi}{\delta x} + cGx$

It is to be noted that the stresses may be completely determined if the derivatives of $\phi$ alone are known. In working out the solution, therefore, it is only necessary to determine the derivatives of $\phi$.

If Equations (29) and (30) are solved for P, the relation

(31) $P = k\phi - \tfrac{1}{2}cG(x^2+y^2)$ is obtained.

It is seen, that according to this relation, P is completely defined in terms of $\phi$.

Moreover, if the center of coordinates of $x$ and $y$ is taken at the center of twist (where the stress is zero and therefore the derivatives of P are zero), the derivatives of $\phi$ are zero and therefore $\phi$ is at a stationary point.

The system utilized in solving the problem is illustrated in the drawing.

The apparatus comprises a metallic base 1, having a suitable cross section, near the center of which one terminal 3 of a source of supply of voltage 5, such as a battery, is connected. The remaining terminal 7 of the voltage supply source 5 is connected to a heavy copper electrode 9 fastened to the outside edge of the base 1.

The base 1 may be regarded as a voltage plate and its cross section is so adjusted that the voltage of points throughout it varies in accordance with the value attained from the Equation (26). Thus, if the illustration given hereinabove is followed through completely, the thickness of the plate 1 varies inversely as the square of the distance from a central point. Since from a strictly mathematical standpoint this condition requires that the thickness of the plate 1 be infinite at the center, the voltage terminal 3 is connected near the center and not precisely at the center.

The model plate 11, (in the present instance, a plate made up in accordance with the conditions required for studying the stress reactions of an airplane wing) is secured to a metallic rim 13 which is in turn supported on the base 1.

By reason of the fact that it is undesirable that the model plate 11 shall in any way affect the voltages attained for the voltage plate 1, the former is constructed of a high-resistance material in comparison with the latter. Thus, the voltage plate 1 may be constructed of copper while the model plate 11 may be constructed of carbon. The ratio of the resistances in this case is approximately 2,000 to 1 and the error introduced by the model plate is extremely small.

Under ordinary circumstances, the values that are most desirable are the derivatives of $\varphi$. These values may be obtained by moving two contacts 15 about the plate 11, holding them respectively, parallel to the axes 17 and 19, and recording the values obtained at the points in a meter 21 connected to the contacts 15. If the distance between the points is taken as comparatively small, the resulting values are the derivatives of $\varphi$.

The value of $$\dfrac{c}{k}$$

may be determined from the equation

(28) $\phi_b = \dfrac{cG}{2k}(r_b)^2$ by simply reading the voltage corresponding to a given value of $r_b$.

Figure 3:
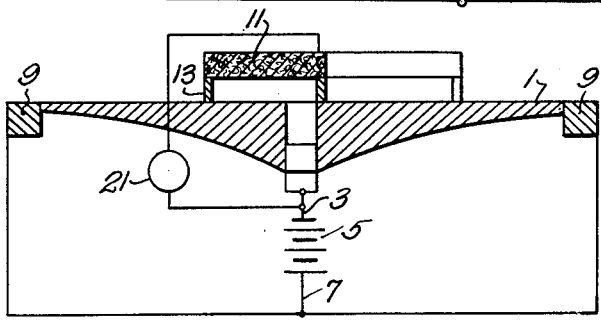
Fig. 3 is a view partly in section and partly diagrammatic showing the essential features of a system for determining the center of twist in accordance with my invention.

The center of twist may be obtained as is illustrated in Fig. 3 by connecting one terminal 15 of the meter 21 to the low-potential point of the battery 5, and, with the remaining terminal in contact with the plate 11 at a point directly beneath the origin of the coordinates, moving the plate until the meter indicates a maximum value.

The point corresponding to the maximum value corresponds to the center of twist of the stressed prismoid.

In the torsion problem the stress for a given moment is the chief objective. This value may be obtained from the above consideration.

It can easily be shown that the total moment is given by the equation $$(34) \quad M = k\left[2\int\int \phi\, d_x d_y - \frac{c}{k}GI_p\right]$$

wherein $I_p$ is the polar moment of inertia of the bar. Hence the stress for a given moment is expressed by the relation $$(35) \quad \frac{Tx}{M} = \frac{2\frac{\delta\phi}{\delta_y} - \frac{cG}{k}y}{\int\int \phi\, d_x d_y - \frac{c}{k}GI_p}$$

and $$(36) \quad \frac{Ty}{M} = \frac{-\frac{\delta\phi}{\delta_x} + \frac{cG}{k}x}{\int\int \phi\, d_x d_y - \frac{c}{k}GI_p}$$

where the integral is taken over the whole surface of the model plate.

It is seen that the problem is thus completely solved and that the values of the stresses for given moment may be obtained by substituting in the Equations (35) and (36).

Although I have shown and described a certain specific embodiment of my invention, I am fully aware that many modifications thereof are possible. My invention, therefore, is not to be restricted excepting so far as is necessitated by the prior art and by the spirit of the appended claims.

I claim as my invention:

1. The method of determining the stress for a given moment existing in a material under the action of a given set of forces, comprising the steps of producing a model plate of predetermined electrical properties having the contour of the cross section of said material, taken normal to the direction of certain of said forces, subjecting said plate to a predetermined potential distribution, measuring the properties of said potential distribution, and substituting the measured values in the equations $$T_x = \frac{M\frac{\delta\phi}{\delta_y} - \frac{c}{k}G_y}{\int\int \phi\, d_x d_y - \frac{c}{k}GI_p}$$

$$T_y = M\frac{\frac{\delta\phi}{\delta_y} + \frac{c}{k}G_x}{\int\int \phi\, d_x d_y - \frac{c}{k}GI_p}$$

wherein $T_x$ and $T_y$ are components of the stresses in two arbitrary directions $x$ and $y$, $\frac{c}{k}$ is a constant that may be determined from the measurements, G is the modulus of the material, $$\frac{\delta\phi}{\delta x}$$

and $$\frac{\delta\phi}{\delta y}$$

are the rates of variation of the potential in said plate taken along the direction $x$ and $y$, M is total twisting moment and $I_p$ is the polar moment of inertia.

2. The method of obtaining a solution of physical problems of the type involving Poisson's equation $$\frac{\delta^2 P}{\delta_x^2} + \frac{\delta^2 P}{\delta_y^2} = -2cG$$

wherein P is a scalar function, $c$ and G are given constants, and $x$ and $y$ are an arbitrary set of rectangular coordinates, comprising the steps of producing a model plate of predetermined electrical and geometrical properties, subjecting said plate to a predetermined potential distribution, measuring the properties of said potential distribution and substituting the measured values in the equations $$\frac{\delta P}{\delta_x} = k\frac{\delta\phi}{\delta_x} - cG_x$$

$$\frac{\delta P}{\delta_y} = k\frac{\delta\phi}{\delta_y} - cG_y$$

wherein $\phi$ is a potential at the points in the plate and $k$ is a constant.

3. The method of determining the center of twist of a prismatical rod under torsion comprising the steps of producing a model plate of predetermined physical and geometrical properties, subjecting the boundary of the plate to a predetermined potential distribution and locating the point of maximum potential existing within the plate.

4. Apparatus for determining stresses in a material under the action of a given set of torsional forces comprising a plate of predetermined electrical conductivity having the configuration of a cross section of said material, means for producing an electrical voltage distribution of predetermined characteristics on the boundaries of said plate, and means for measuring the voltage distribution throughout said plate.

5. The method of determining the stresses in a prismoid that is under the action of a given set of torsional forces, comprising the steps of constructing a plate having the contour of the cross-section of said prismoid, said plate having a predetermined electrical conductivity, subjecting said plate to a predetermined electrical voltage distribution and measuring the characteristics of the voltage distribution developed in said plate.

6. The method of determining the center of twist of a prismatical rod under the action of a set of torsional forces which comprises the steps of producing a model plate having the contour of the cross-section of said rod, said plate having predetermined physical properties, subjecting said plate to a predetermined potential distribution and locating the point of maximum potential existing within the plate.

In testimony whereof, I have hereunto subscribed my name this 22nd day of August, 1930.

MORRIS STONE.